Patented June 27, 1939

UNITED STATES PATENT OFFICE 2,163,846

PREPARATION OF ORGANOSODIUM COMPOUNDS

Avery A. Morton, Watertown, Mass., and Ingenuin Hechenbleikner, Charlotte, N. C.

No Drawing. Application August 13, 1936, Serial No. 95,842

2 Claims. (Cl. 260—665)

This invention relates to a method for the preparation of organosodium compounds.

In the preparation of hydrocarbons by the conventional synthesis known as the Wurtz synthesis, involving the action of sodium on hydrocarbyl chlorides, an intermediate step in this synthesis is the occurrence of an organosodium compound, but because of its great reactivity it has not hitherto been possible under general conditions to halt the reaction at that stage. The ordinary method of carrying out a Wurtz synthesis is to add sodium, preferably in a finely divided state, to the hydrocarbyl chloride, either with or without a solvent, and to reflux the mixture in order to effect or complete the reaction. One atom of sodium is theoretically required for every mole of hydrocarbyl chloride. The procedure which is herein being described enables the intermediate organosodium compound to be isolated.

The organosodium compounds so obtained are mixtures of mono- and disodium compounds which upon carbonation yield carboxylic acids. Many of the dicarboxylic acids made in this manner are particularly valuable because they are substituted malonic acids which are used as intermediates in the preparation of important pharmaceuticals. Other uses of these organosodium compounds will be found as this simplification in their method of preparation renders them more available.

The method includes the addition of a hydrocarbyl chloride, (by which term it is intended to include both alkyl and aryl) to an excess of finely divided sodium at low or moderate temperatures.

Hydrocarbyl chloride is added to the finely divided sodium and the temperature is controlled so that the mixture is kept at 30° C. or lower. Two atoms of sodium are required for every mole of hydrocarbyl chloride. The yields are better if the amount of sodium exceeds this amount and are poorer if less than this quantity. The yields fall off markedly if temperature rises to 80° C.

As an illustration of the process the preparation of amyl sodium and amylidene disodium from amyl chloride and sodium is given: To 10 grams of fine sodium sand in 50 cc. of dry ligroin was added gradually with stirring a solution of 20 cc. of n-amyl chloride in 50 cc. of ligroin. The reaction mixture was protected by an atmosphere of dry nitrogen. The temperature was kept near 20° by cooling water on the outside of the container. The time required for addition was 75 minutes and the stirring was continued, after addition had been completed, until the reaction mixture no longer evolved heat. The product consisted of amyl sodium and amylidene disodium mixed with sodium chloride and some unchanged sodium. The equations for the formation of these products are:

(1) $C_5H_{11}Cl + 2Na \rightarrow C_5H_{11}Na + NaCl$
(2) $2C_5H_{11}Cl + 4Na \rightarrow C_5H_{10}Na_2 + C_5H_{12} + 2NaCl$ The products can be carbonated in the conventional manner to give caproic and butyl malonic acids. The preparation of the latter compound is of considerable interest since in this one step there is obtained a product which hitherto so far as we are aware could be obtained only by several operations. But if the carbon dioxide is passed in during the adding of the hydrocarbyl chloride to sodium, instead of carbonating at the end of the addition, the intermediate organosodium compound reacts at once with the carbon dioxide. Higher yields are thereby obtained, since the active sodium compounds have no opportunity to complete the Wurtz synthesis.

The simultaneous presence of carbon dioxide with the freshly generated intermediate organometallic compound is a means of prompt removal of the organometallic product, which is isolable under the said conditions.

Notwithstanding any known instance where simultaneous reaction of carbon dioxide, hydrocarbon chlorides, and sodium has produced acid, this modification of the described method is unique in that it is accomplished under conditions discovered essential for the isolation of intermediate organosodium compounds.

The preparation is not limited to the use of ligroin or an aliphatic hydrocarbon as a solvent. When carried out in toluene or in a toluene-ligroin mixture the products are benzyl sodium and benzylidene disodium. The overall equations for the formation of these two materials are:

(3) $C_6H_5CH_3 + C_5H_{11}Cl + 2Na \rightarrow$
$C_6H_5CH_2Na + C_5H_{12} + NaCl$
(4) $C_6H_5CH_3 + 2C_5H_{11}Cl + 4Na \rightarrow$
$C_6H_5CHNa_2 + 2C_5H_{12} + 2NaCl$ When benzene is used as the solvent, or benzene and ligroin, the products are phenyl sodium and phenylene disodium. The same products can be obtained if the addition of benzene is reserved until after the formation of amyl sodium and amylidene disodium is completed.

The mixture is usually warmed to effect a complete change.

In other words, the sodium compounds are capable of reacting with aromatic hydrocarbons forming other organosodium compounds which in turn may be carbonated to give other acids. These facts extend the usefulness of this preparation because they provide means of synthesizing organosodium compounds which because of expense or other unsuitable nature of the chloride, would be difficult to obtain. As examples of obstacles amounting to unsuitable nature which the invention provides means to overcome, there may be mentioned sluggishness in reaction, or instability of the organosodium compound resulting from the reaction with the chloride. Thus it may be supposed that the hydrocarbyl chloride has reacted with sodium, but that the organosodium compound resulting is either thermally unstable, or is reactive with more of the chloride. By running the reaction in benzene, phenyl sodium is formed instead; and this organosodium compound is more stable.

Indeed any solvent or mixture of solvents can be employed which will not of itself react with sodium metal. Substances other than aromatic hydrocarbons which would react with the organosodium compound, but not with sodium under the conditions employed in this reaction, may be added to ligroin.

The process herein described is capable of wide application. An organic chloride which reacts with difficulty can usually be induced to take part in the reaction by admixture with more reactive chlorides.

Heat may be applied at the beginning of some reactions in order to get them started. Afterward the temperature is lowered to facilitate isolation of the intermediate organosodium stage. This and other conventional laboratory procedures for initiating reactions are not considered to constitute essential deviation from the broad nature of the process which is being disclosed.

We claim as our invention:

1. The process of adding a primary amyl chloride gradually and with agitation to finely divided sodium in the proportion of one molecule of the chloride to two atoms of sodium, in the presence of a solvent which does not react with sodium metal; permitting a reaction between said chloride and the sodium to occur, meanwhile extracting from the mixture heat evolved by the reaction so that the temperature does not exceed 80° C., the reaction being one which gives optimum yield when the temperature is maintained below 30° C. and being a reaction whose product is an organosodium compound which can be caused to react with a wide variety of reagents.

2. A process as in claim 1 in which the mixture during and immediately after the said reaction is devoid of substances, other than the amyl chloride which is being added, which are of a nature to react with the said organosodium compound so as to make a product other than an organosodium compound.

AVERY A. MORTON.
INGENUIN HECHENBLEIKNER.